INVENTOR
JOHN J. AMIC, Sr.
BY
ATTORNEYS

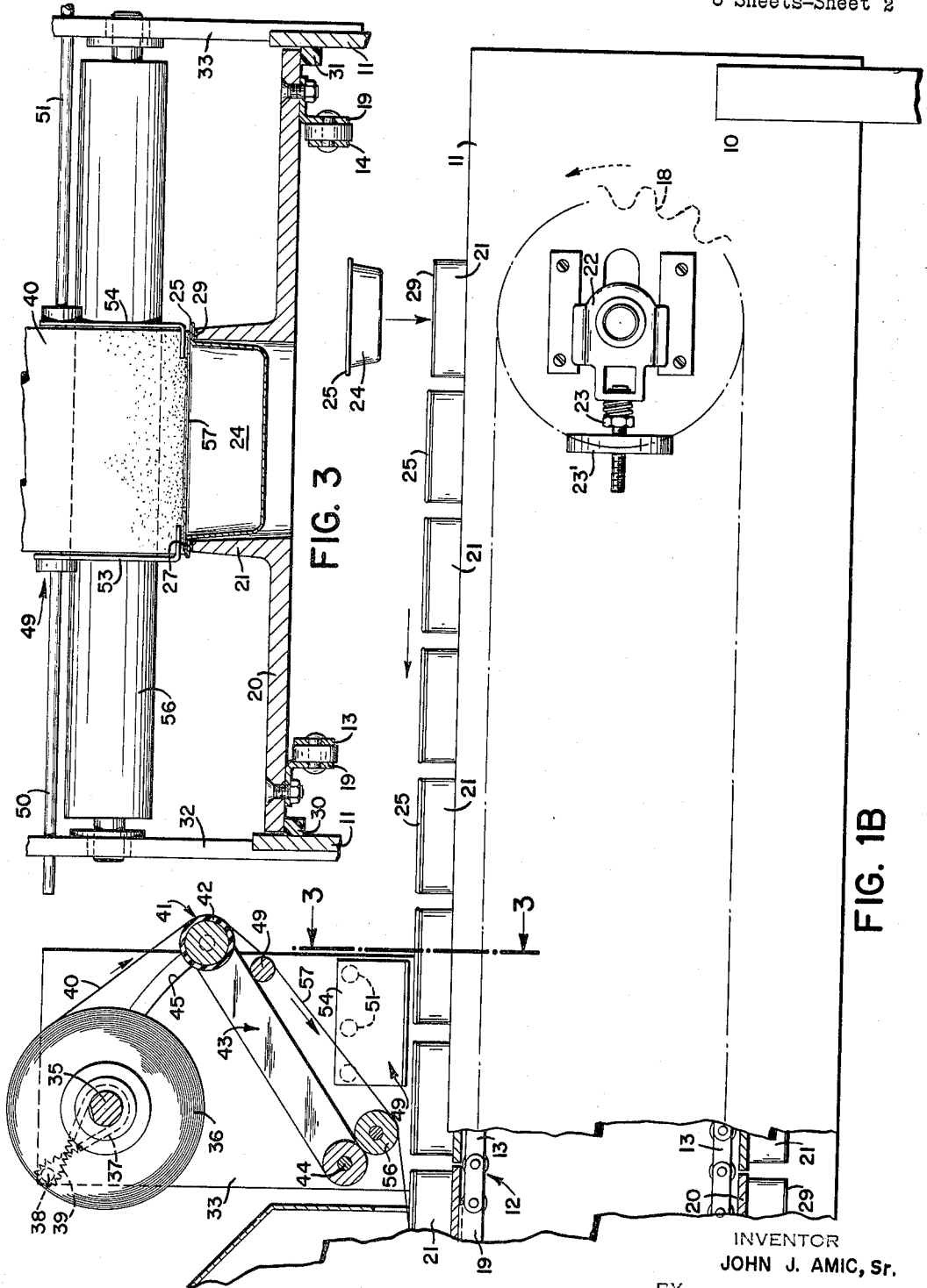

INVENTOR
JOHN J. AMIC, Sr
BY
ATTORNEYS

April 19, 1966 J. J. AMIC, SR 3,246,448
CONTAINER CLOSING APPARATUS
Filed Jan. 10, 1962 6 Sheets-Sheet 4

INVENTOR
JOHN J. AMIC, Sr.
BY
Pennie, Edmonds, Morton, Barrows & Taylor
ATTORNEYS April 19, 1966  J. J. AMIC, SR  3,246,448
CONTAINER CLOSING APPARATUS
Filed Jan. 10, 1962  6 Sheets-Sheet 6

INVENTOR
JOHN J. AMIC, Sr
BY
Pennie, Edmonds, Morton, Barrows & Taylor
ATTORNEYS

United States Patent Office 3,246,448
Patented Apr. 19, 1966

3,246,448
CONTAINER CLOSING APPARATUS
John J. Amic, Sr., Louisville, Ky., assignor to Anaconda Aluminum Company, a corporation of Montana
Filed Jan. 10, 1962, Ser. No. 165,391
8 Claims. (Cl. 53—373)

This invention relates to apparatus for closing containers. More particularly it relates to apparatus for closing containers wherein successively conveyed containers are continuously heat and pressure sealed by matching sealing dies on endless chains.

Closing apparatus of the type provided by this invention is especially useful for closing containers which are moved successively through a closing station on a conveyor. One of the major advantages of this new apparatus is that it can successively close containers so conveyed without requiring that the conveyor be intermittently stopped and started to hold each container at the working station during the closing operation. Since the apparatus is capable of closing the conveyor without in any way interrupting the uniform travel of the containers on the conveyor, it is particularly suited for the closure of containers carrying materials which cannot readily withstand intermittent starting and stopping, such as liquid or semiliquid foodstuffs packed in shallow aluminum foil pans. Another advantage is that unlike most containers closing appratus which require a specially formed lid for crimping on the containers, the apparatus of the invention is adapted to close the containers by heat and pressure sealing sheet material from a coil to the containers, and subsequently severing the excess sheet material between the thus-sealed containers. Furthermore, because the lids are preferably applied as a strip of material from a coil, the containers can be closed at a faster rate than heretofore possible. Moreover, despite the increased rate of closure, the apparatus can still effectively heat-seal the lid on the container because the apparatus is constructed to permit the top and bottom sealing dies to travel in a linear path in substantially meshed relationship for an interval of time.

The container closing apparatus of the invention, which is particularly suitable for closing and sealing containers containing any item to be hermetically sealed, such as foodstuffs, broadly comprises a first endless chain of sealing dies and a second endless chain of matching sealing dies. The chains of matching dies are movable in substantially the same plane of travel and the dies of the second chain are adapted to hold and convey the containers. A closing station is provided at which opposed matching dies from the respective chains travel together in substantially meshed relationship through a linear distance. Synchronized driving means are provided for continuously moving said chains of matching sealing dies at the same rate of travel. Feeding means are located adjacent the closing station for continuously feeding to the closing station a strip of lidding material adapted to be heat sealed to the containers. Heating means are associated with at least one of the chains of sealing dies for maintaining the sealing dies at an elevated temperature sufficient to heat seal said lidding material to the containers.

In the apparatus described above, the lidding material is preferably coated with a heat sensitive adhesive on the surface thereof which faces the container. The lidding material is pressed on the container by the matching dies in their substantially meshed relationship and since they travel in this relationship through a linear distance, the heated die is in contact with the container or lidding material for a sufficient but brief period of time to melt the adhesive and thereby effect a pressure and heat seal. Moreover, because of the construction of the apparatus permitting this meshed relationship for a linear distance, there is no necessity to intermittently stop the progression of the containers and thus, a greater number of containers can be closed and sealed than was heretofore possible.

The invention further provides pressuring means for urging the matching dies together at the closing station and a cooling device for immediately chilling the soft adhesive and making the seal permanent. Additionally, the apparatus includes cutting means located downstream from the closing station to successively cut the excess lidding material from between the sealed containers. Specifically a cutting device is used, and consists of a resiliently mounted blade assembly positioned adjacent the path of travel of the containers. Cam means are associated with the blade assembly to displace the assembly in a direction toward and away from the path of travel of said lidding material and simultaneously oscillate the assembly in a plane substantially parallel to the plane of the path of travel of said lidding material. Drive means are provided for driving the cam means and thereby imparting said motion to the blade assembly.

Obviously, by the addition of the pressure, cooling, and cutting means, even greater efficiency is achieved with the new apparatus, since after the cutting operation, which can also be performed without stopping the conveyance of the containers, a completely sealed package is ready to be unloaded and packed for shipping. It is contemplated that such apparatus can be used for packaging many types foodstuffs, and the like, which are usually packaged in ordinary cylindrical containers, and can do so at a substantial savings in packaging costs, both in materials and in operational expenses, without loss in the protective quality of the package to the matter packed therein.

A preferred embodiment of the container closing apparatus of the invention is described hereinbelow with reference to the drawings wherein:

FIG. 1B is a continuation of the apparatus of FIG. 1A and is an elevation partly in section showing the inlet end of the apparatus;

FIG. 3 is a fragmentary section on an enlarged scale taken substantially along the lines 3—3 of FIG. 1B;

Figure 1A:
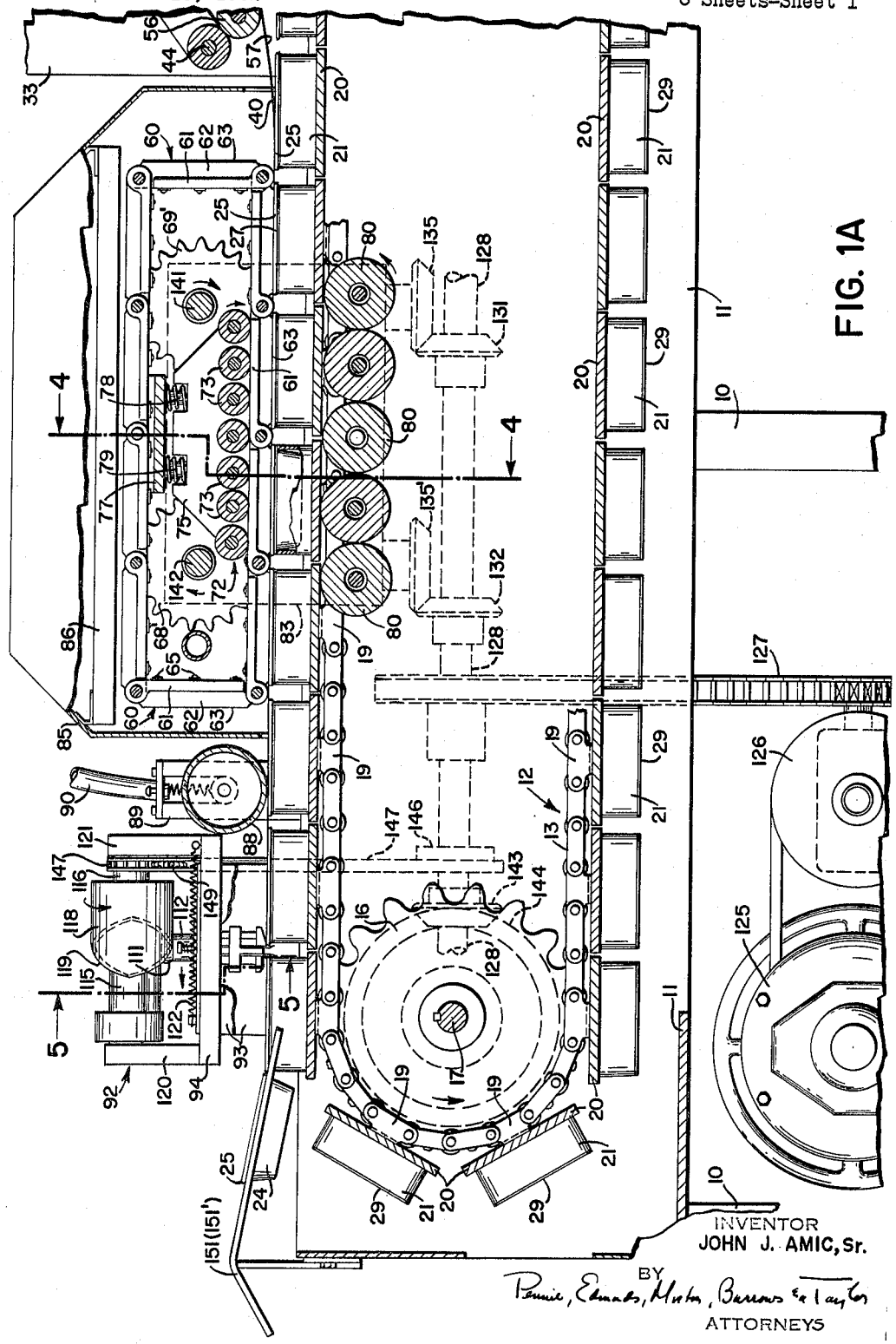
FIG. 1A is an elevation partly in section of the outlet end of the apparatus including the closing station of the apparatus.
Figure 4:
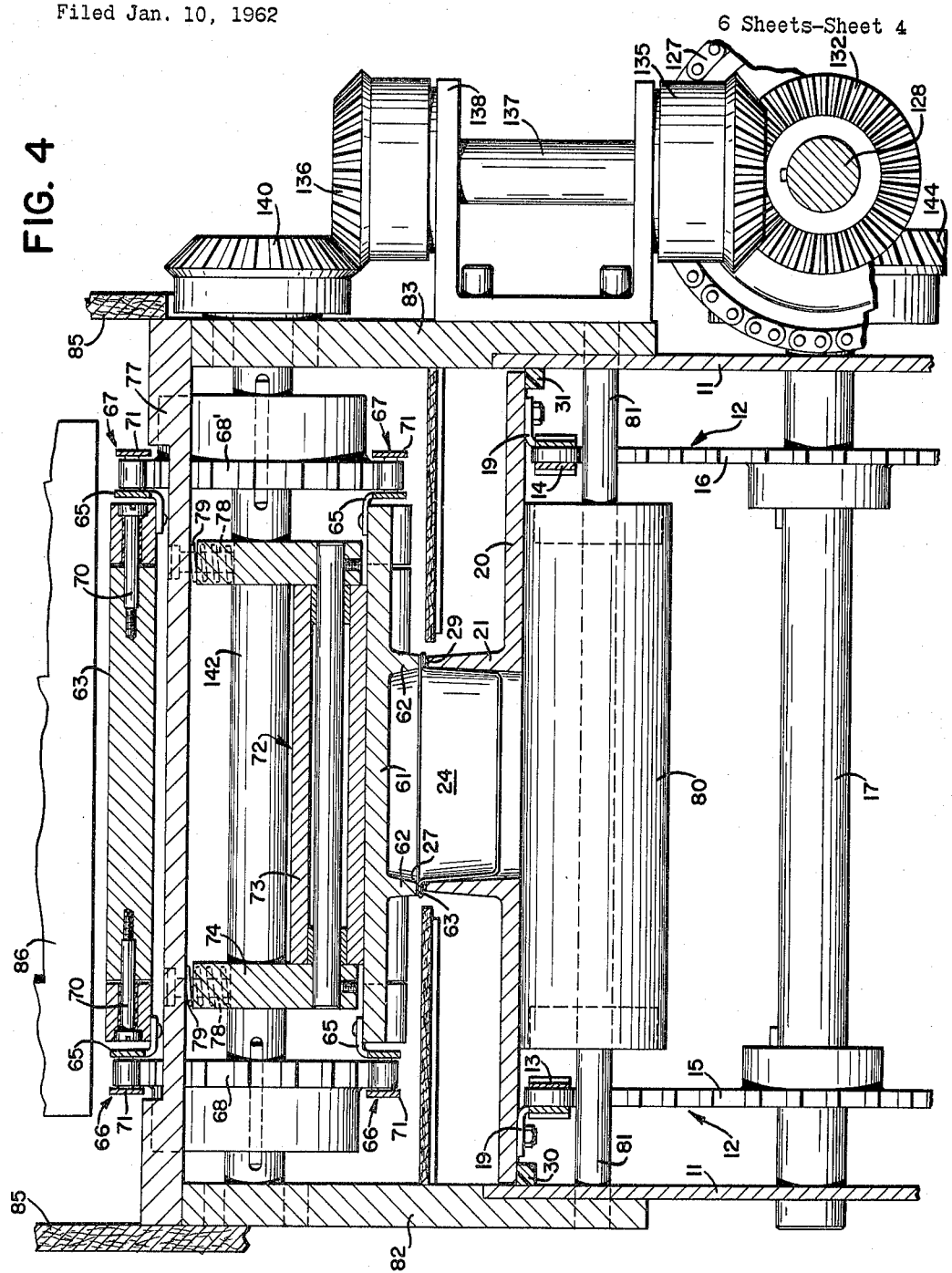
FIG. 4 is a fragmentary section on an enlarged scale taken substantially along the lines 4—4 of FIG. 1A.

Referring to FIGS. 1A and 1B together, standards 10 are shown supporting a housing 11 in which a conveyor assembly 12 is movable. The conveyor assembly 12 consists of two endless chains 13 and 14 which are driven by a pair of sprockets 15 and 16 mounted at the outlet end of the apparatus (as shown in FIG. 4). The sprockets 15 and 16 are keyed to an axle 17 which is rotatably mounted in the housing 11, and the endless chains 13 and 14 which travel thereon also travel on a pair of sprockets 18 at the inlet end of the apparatus. Securely mounted in a suitable manner to the endless chains 13 and 14 by means of angle brackets 19 is a die plate 20. Substantially rectangular projections extend in a plane perpendicular from the plane of the plate to define a bottom sealing die 21. Here, the die 21 is integral with the plate 20, but the projections forming the die could be a separate rectangular member. A plurality of such sealing dies 21 and plates 20 are similarly mounted along the length of the chains 13 and 14, thereby forming an endless conveyor of bottom sealing dies. The adjacently mounted plates 20 are not connected however, and are thus able to negotiate the nonlinear path of travel followed by the chains 13 and 14 as they travel around the sprockets.

As shown in FIG. 1B the pair of sprockets 18 mounted at the inlet end of the apparatus are rotatable in a journal 22 which is mounted in the housing 11 to slide in a longitudinal direction by turning the adjustment screw 23 which is threaded in the bracket 23'. This adjustment means permits the pair of sprockets 18 to be adjusted longitudinally to maintain the proper tension on the endless conveyor assembly 12.

As shown in FIG. 1B the bottom sealing dies 21 are adapted to receive individual open containers 24 such that the flange portion 25 of the containers will be supported on the outermost peripheral portion of the die 21 which substantially defines a die surface 27. As shown in FIG. 3 and FIG. 4, a resilient gasket 29 is vulcanized on the die surface 27 for the purpose of concentrating pressure to this area, and as will be seen, for the dual purpose of also concentrating heat to that area and to provide an insulation to minimize heat transmission to the bottom sealing dies. These containers 24 may be shallow aluminum pans of the type adapted to hold foodstuffs, and they are loaded into the dies 21 at the inlet end of the machine as shown in FIG. 1B, complete with foodstuff contained therein. Alternatively, the containers 24 could be loaded into the dies 21 at the inlet end of the machine, and the empty containers could then be filled with foodstuff or the like as they are conveyed to the closing station. The containers 24 are then continuously conveyed in the bottom sealing dies to have a lid sealed thereon.

As shown in FIG. 4 longitudinal extending nylon races 30 and 31 are attached to the inside wall of the housing 11 and extend parallel to each other substantially for the length of the linear path of travel of the lower sealing dies 20. The marginal edge portions of the plate 20 ride on the races 30 and 31 during this linear path of travel, thereby aiding in the smooth movement of the dies.

Disposed on both sides of the bottom sealing dies 21, as they are being conveyed to the closing station, and mounted on the respective sides of the housing 11 are parallel supports 32 and 33. Rotatably mounted in the supports 32 and 33 is an axle 35 on which coil 36 of sheet material, such as aluminum foil or an aluminum foil and paper laminate, is disposed. As indicated in FIG. 1B a friction strap 37 is lapped over the axle 35 and is mounted under tension to a support 38 by means of a spring 39. This strap is provided to retard the freedom of rotation of the coil of sheet material so that upon uncoiling a strip 40 of sheet material, it will be done with a certain degree of tautness. A guide roller 41, which has a rubber coating 42, is rotatable within bracket assembly 43 which in turn is pivotable about the axis 44 and is also mounted in the supports 32 and 33. A pair of slots 45 are similarly formed in each of the supports 32 and 33, and substantially describe the same arc which would be described by the roller 41 as it is pivoted about its axis 44. This arrangement permits the guide roller 41 to be adjusted according to the size of the coil and the tension desired as the sheet material is stripped therefrom. A tie rod 47 extends between the supports 32 and 33 for structural support thereof and also serves as a stop for the bracket assembly 43 in its outermost position.

A sheet centering assembly 49 (as best shown in FIG. 3) consists of a plurality of transverse supporting elements 50 and 51 which are secured to the supports 32 and 33 and extend therefrom toward each other, respectively. This plurality of the transverse supports 50 and 51 holds a pair of bracket plates 53 and 54 which extend in a plane parallel to the supports 32 and 33 and are spaced from each other a distance slightly greater than the width of the strip 40 of sheet material being fed. The plates are also mounted, such that they extend in the same direction as the path of travel of the containers and closely spaced therefrom. Hence, the bracket plates substantially overlie the bottom sealing dies 21 and thereby serve to guide the strip 40 of sheet material to a position directly in register with the successively fed containers 24 to close the openings therein. A second guide roller 56 is also rotatably mounted in the supports 32 and 33 on a portion thereof nearest the moving dies 21 to further facilitate proper disposition of the sheet material in alignment with the peripheral portion 25 of the advancing containers. It is to be noted, for reasons to be discussed below, that the strip 40 of sheet material is preferably coated with a heat sealing adhesive coating 57 on its surface which faces the advancing containers.

Referring particularly to FIG. 1A, FIG. 1B and FIG. 4, the sealing and closing apparatus is shown. As the strip 40 of sheet material is removed from the coil 36 and passed over the roller 41 between the centering bracket assembly 49 and against the roller 56, it is then deposited on the flange portion 25 of the container 24 and is conveyed with the containers and bottom dies 21 through a closing station. At the closing station an endless chain of top sealing dies 60 is provided. The top sealing dies 60, as shown in FIG. 4, consist of a sealing plate 61 with projections 62 extending therefrom. The projections 62 have substantially the same length to width dimensions as the projections forming the bottom sealing die 21 and thereby defined a top die 62 having a matching die surface 63. The die plates 61 are secured by an angle bracket 65 to an endless chain 66 along one side, and to a second endless chain 67 on the opposite side. The endless chains 66 and 67 are in turn driven by a first pair of sprockets 68 and 68' mounted toward the outlet end of the apparatus and a second pair of sprockets 69 and 69' mounted toward the inlet end of the apparatus. The dies 62 are pivotally mounted to the brackets 65 by means of a pin and bearing assembly 70. This permits the endless chain of top sealing dies 60 to negotiate their nonlinear path of travel as they are driven by the sprockets. In this embodiment the endless chains 66 and 67 consist essentially of a series of elongated links 71 which have substantially the same length as the length of the top and bottom sealing dies. By means of this arrangement, once the sealing die 60 has negotiated its nonlinear turn, it will travel in an inverted position in a substantially linear path as its traverses the closing station. As shown in FIG. 1A, a matching top sealing die 62, after negotiating the nonlinear turn in its endless path, substantially meshes with the bottom sealing die 21 with their respective die surfaces 63 and 27 in registry, and with the flange portion 25 and the sheet material 40 therebetween. In this meshed relationship the top and bottom sealing dies are then conveyed for approximately four sealing die lengths during which time the sheet material closes and seals the container.

During their course of travel, the top and bottom sealing dies are maintained in their meshed relationship by means of a pressure roll assembly 72. This pressure roll assembly 72 consists of a series of rolls 73 which are rotatably mounted in parallel plates 74 and 75 which extend to a position adjacent the moving dies. The rolls 73 are spaced from each other such that they are arranged in a plane substantially parallel to the plane described by the path of travel of the sealing die. The rolls 73 are in pressure engagement with the plates 61 of the top sealing dies 60 as the individual dies are conveyed thereby. The parallel plates 74 and 75 of the pressure roll assembly are in turn secured to a top mounting plate 77 by means of pins 78 and depend therefrom close to the plate 61. A pressure spring 79 is provided between the pressure mounting plate 77 and the parallel roller plates 74 and 75 thereby constantly urging the rolls down against the top sealing plate 61 but permitting the rolls to float up and down as may be required due to any change in dimension of parts. The pressure exerted upon the top sealing die 60 can be altered by the adjustment of tension of the springs or use of different size springs.

Positioned beneath the bottom sealing dies and substantially underlying the pressure rolls 73 are a series of supporting rolls 80 which extend in a plane substantially parallel to the plane described by the path of travel of the sealing dies. The rolls 80 are rotatable on an axle 81 which is mounted in the housing 11 and in plates 82 and 83 which are connected to the housing 11 but extend above the housing, and which also serve to support the mounting plate 77. The rolls 80 contact the bottom sealing die plate 20 and provide a resistance to the pressure exerted by the pressure roll assembly. By means of this arrangement the top and bottom sealing dies can be maintained in tightly meshed relationship throughout their course of travel.

As shown in FIG. 1A, an oven housing 85 substantially surrounds and houses the top sealing dies 60. This housing is necessary because mounted in the top portion of the oven 85 and overlying the top sealing dies 60 as they traverse their linear path of travel when not in meshed relationship with the bottom sealing dies, is a thermostatically controlled infrared heater 86. The infrared heater 86 serves to maintain the top sealing dies at elevated temperatures and thereby permits the dies upon contact with the sheet material to heat seal the coating 57 of heat sealable adhesive on the sheet material to the flange portion 25 of the containers. The oven housing serves to contain the heat in the area adjacent the dies 60. Immediately upon emerging from the closing station, the strip 40 of sheet material which has now been sealed to the container 24 passes over a cooling roll 88, which is a substantially hollow roll axially mounted in vertical supports 89 to which a cooling fluid is fed by means of the conduit 90. The cooling roll 88 serves to chill and make permanent the heat seal of the sheet material to the container.

Figure 5:
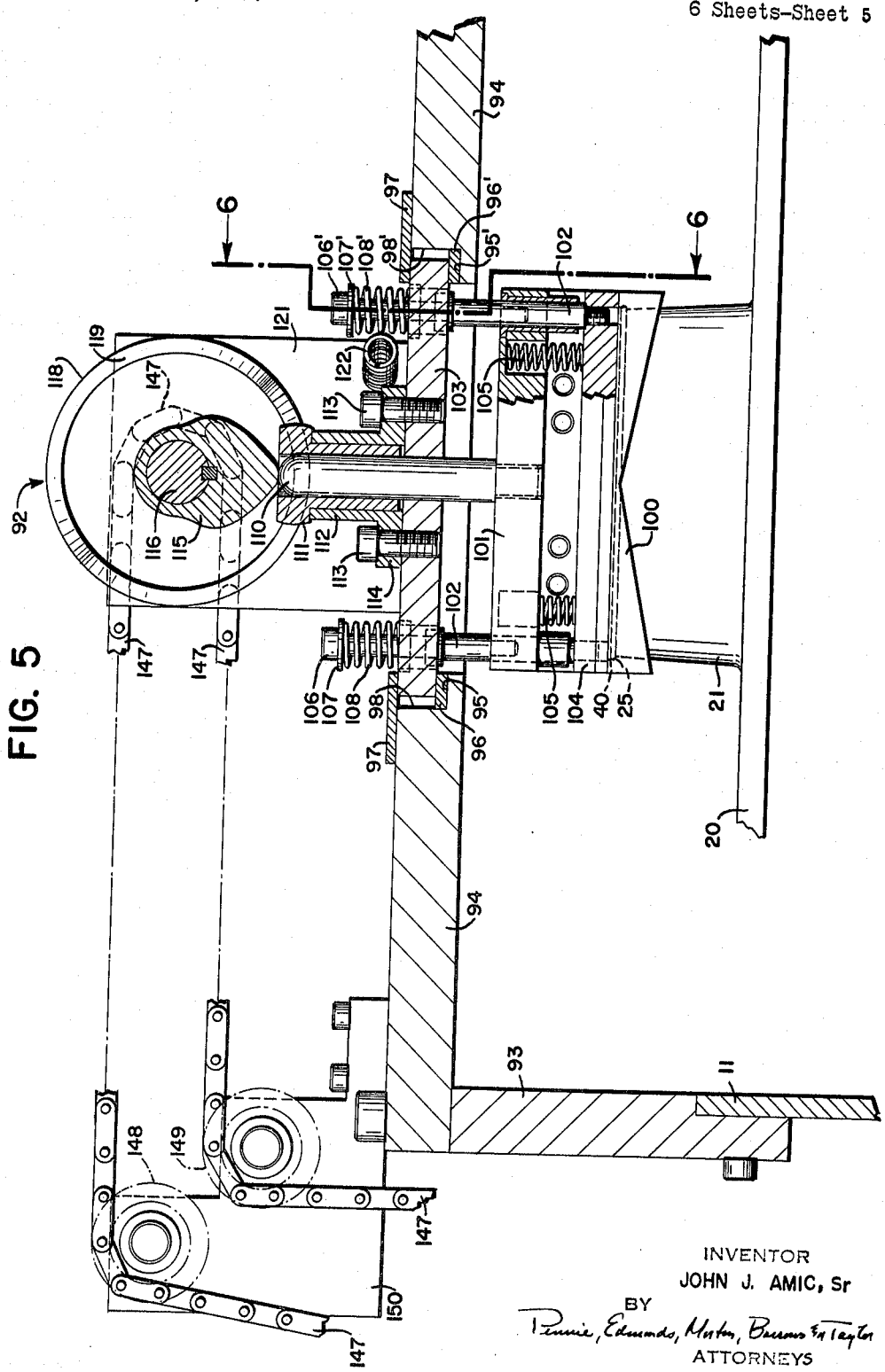
FIG. 5 is a fragmentary section of the cutting device on a still larger scale taken substantially along the lines 5—5 of FIG. 1A.

The resultant sealed container is next passed to a cutting device 92 which is provided to sever the excess strip of sheet material between the successive containers. This cutting device is best shown with reference to FIGS. 1A, 5 and 6. Since the containers are being continuously conveyed, the cutting device must be able to travel with the containers for a short distance and at the same speed to sever the excess sheet material between the closely spaced containers. As best shown in FIG. 5 the cutting device is secured to the housing 11 by extension supports 93 (a similar support as the extension support 93 is disposed parallel thereto for supporting the base plate 94) and is bolted on base support 94. The center of horizontal plate 94, closest to the cutting device 92, has substantially L-shaped edges and thereby define shoulders 95 and 95' in which elongated bearing plates 96 and 96' are mounted. Spaced above the bearing plates 96 and 96' respectively, are second bearing plates 97 and 97' which are also mounted on the horizontal support 94. These bearing plates 96 and 96' serve to define slots 98 and 98' in which the blade assembly is slidable. The blade assembly consists essentially of a pair of blades 100 which are spaced apart a distance slightly less than the space between the adjacent containers. The blades 100 are mounted on a supporting bracket 101 which is movable vertically and is guided by parallel columns 106 and 106'. The parallel columns 106 and 106' are secured to and extend perpendicularly from a plate 103 which is slidable within the slots 98 and 98'. Mounted on the ends of the columns 102 and 102' is a pressure plate 104 which is maintained in spaced relationship with the bracket 101 by means of springs 105 and 105'. The springs 105 and 105' tend to maintain the pressure plate 104 downward as the blades 100 are moved upward past the pressure plate into a noncutting position. The bracket 101 is similarly resiliently mounted to the plate 103 by means of the parallel studs 106 and 106' which extend perpendicular to and beyond the plate 103. Each of these studs 106 and 106' is suitably fixed to the plate by means of a flange 107 and spring 108, and thus in resilient relationship therewith. Secured to the bracket 101 and extending therefrom is a perpendicular cam follower 110. The cam follower 110 extends through the plate 103 and is slidable in a parallel cam follower 111. The parallel cam follower 111 is mounted on the horizontal plate 103 by means of a flange collar 112 which has bolts 113 threaded into the plate 103 through the flange portion 114 thereof.

Figure 6:
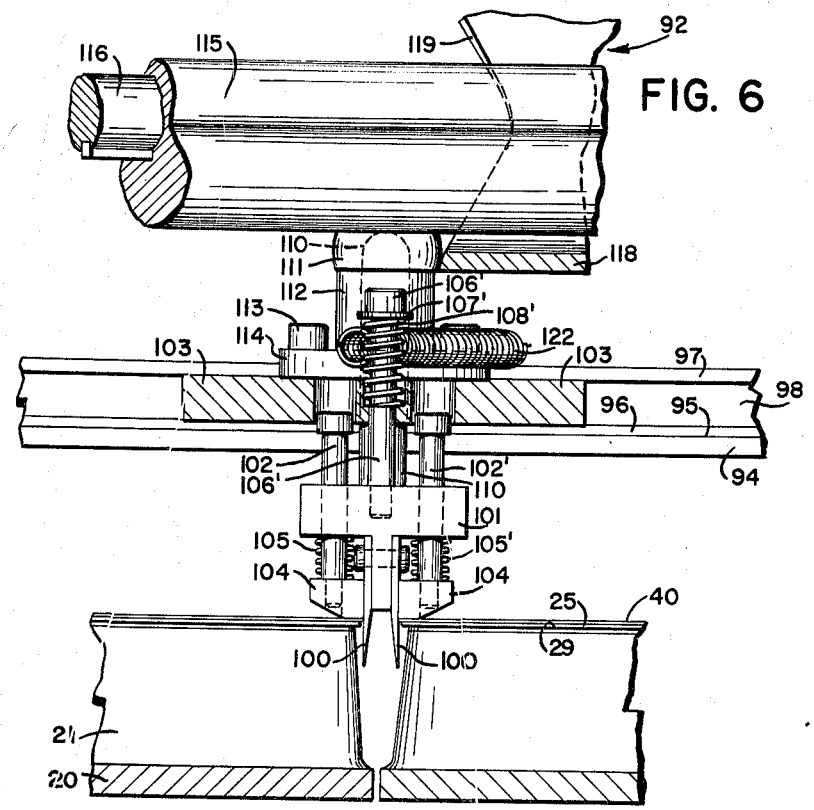
FIG. 6 is a fragmentary side elevation partly in section of the cutting device taken substantially along the lines 6—6 of FIG. 5.

As shown, the blades 100 are in their lowermost cutting position and therefore the vertical cam follower 110 has been displaced by and is in contact with an eccentric cam 115. The cam 115 has an eccentric cross section and is keyed to a drive shaft 116. As can be seen in FIG. 5, as the shaft 116 is rotated the cam follower 110 will slide along the cam surface and be displaced in a direction perpendicular toward and away from the linear path of travel of the containers thereby causing the blades 100 to be lifted above the top surface of the containers. As best shown in FIG. 1A and FIG. 6, substantially concentrically mounted about the drive shaft 116 is a second cam 118. The second cam 118 has an irregular cam surface 119 which is adapted to displace the parallel cam follower 111 in a direction parallel to the linear path of travel of the containers and thereby to displace the blade assembly causing it to oscillate in a plane parallel to the linear path of travel of the containers and in a direction toward and away from the direction of movement of the containers. The drive shaft 116 is rotatable in structural supports 120 and 121 which are arranged substantially parallel at each end of the shaft. As also shown, a spring 122 is secured to the structural support 121 and to the plate 103 of the blade assembly. This spring 122 serves to maintain the parallel cam follower 111 constantly urged against the cam surface 119, thereby permitting the cutting assembly to be oscillated as described.

Figure 2:
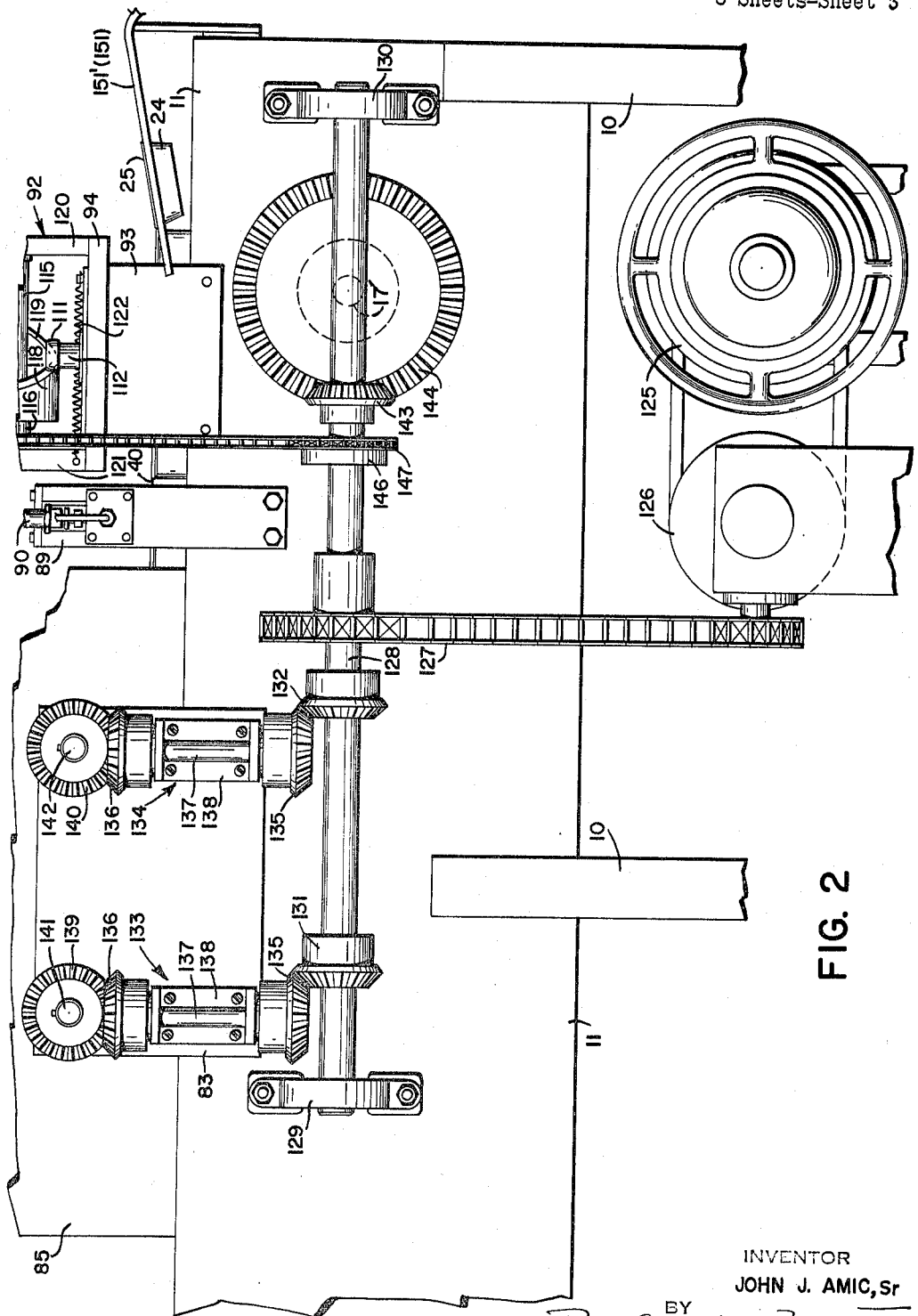
FIG. 2 is an elevation of the back portion of substantially the apparatus of FIG. 1A showing the drive mechanism of the apparatus.

A synchronized drive mechanism is provided to coordinate the functions of the related parts of the apparatus. As shown in FIG. 1A and FIG. 2 an electric motor 125 is connected to a variable drive unit and then to a speed reducer 126 in a suitable manner, which in turn drives a drive chain 127. The drive chain 127 is connected to and drives a drive shaft 128. The drive shaft 128 is mounted at its ends in suitable journals 129 and 130. A pair of bevel gears 131 and 132 are secured to the drive shaft and rotated therewith. Each of the gears 131 and 132 drives a pair of linking gear assemblies 133 and 134, each of which consists of two bevel gears 135 and 136 mounted at the ends of a shaft 137 which is rotatable in a journal 138. The linking gear assemblies in turn mesh with drive gears 139 and 140 which are mounted on shafts 141 and 142 which in turn are rotatably mounted in plates 82 and 83. As shown in FIG. 4, the shafts 141 and 142 serve to drive the pair of sprockets 68 and 68' and the pair of sprockets 69 and 69' respectively.

A third bevel drive gear 143 is also mounted on the drive shaft 128. The bevel drive gear 143 drives a larger drive gear 144 which in turn rotates the drive shaft 17 and, as seen in FIG. 4, drives the drive sprockets 15 and 16 of the endless conveyor 12.

Also secured to the drive shaft 128 is a sprocket 146 on which a drive chain 147 is rotatable. The drive chain 147 extends from the sprocket 146 and over guide sprockets 148 and 149 which are mounted on the projecting frame 150 which in turn is secured to the plate 94. As shown in FIG. 5, the drive chain 147 extends about the drive shaft 116 of the cutting device 92 thereby rotating the shaft. It can be seen that the movements of all the parts of the apparatus are synchronized by the mechanical drive means described above and thus the apparatus provides a means for continuously closing containers as they are successively fed without stopping and simultaneously cutting and unloading these containers.

In operation the containers with foodstuff contained therein are deposited at the inlet end of the machine into the dies 27 and are conveyed with the bottom dies 21 toward the top sealing dies 60. Prior to being fed under the top sealing dies, a strip 40 of sheet material is placed over the flange portion 25 of the container and substantially closes the opening thereof. The top and bottom sealing dies are being rotated at the same speed, and since they have matching dimensions to the die surfaces 63 and 27 respectively, they engage in substantially meshed relationship with the flange portion 25 of the container 24 and the strip 40 of sheet material held therebetween. They are maintained under pressure in this relationship by means of the pressure rolls 73 and travel together for a linear distance, substantially the length of four die lengths, during which time they are pressure and heat sealed by the heated top sealing dies 60 which have been maintained at their elevated temperature by the infrared heater 86. The heat sealing adhesive coating 57 is heated in an area overlying the flange portion 25 of the container and is sealed thereto. Hence, alternatively the flange portion 25 of the container can be coated with a heat sealing adhesive and the same effect would be achieved. Thus, upon the application of heat and pressure a truly secure closure is obtained and, as the thus sealed containers are moved from the closing station they pass over and in contact with a cooling roll 88 which serves to quicken the permanency of the seal so that the containers can be immediately fed to a packing operation. The containers are further conveyed past a cutting device 92 which travels with the containers for a short distance during which its blades are displaced perpendicular to the path of travel of the containers by a cam arrangement to sever the strip of sheet material between the adjacent containers. The blades are then lifted and moved in a direction opposite to the path of travel of the containers, and are again displaced toward said path of travel when the next container is conveyed thereby. A pair of fingers 151 and 151' are provided at the outlet end of the machine and are adapted to fit under the flange portion 25 of the container and to lift the containers from the dies 21 as the dies negotiate their nonlinear path of travel about the sprockets 15 and 16. Then, the containers are successively slid along the fingers 151 and 151' and thereby automatically unloaded.

Figure 7:
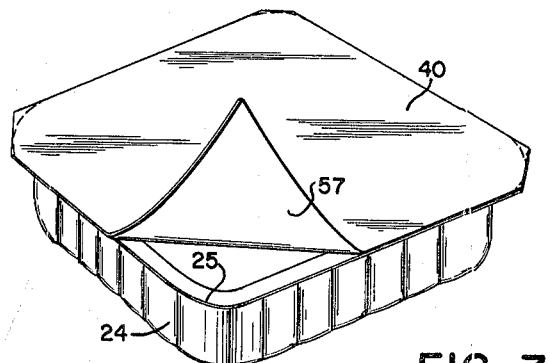
FIG. 7 is a perspective of the container closed by the apparatus.

With the endless conveyor of lower dies 21 mounted on respective plates 20 and travelling in a substantially horizontal linear path while in matching relationship with top dies 60 on their respective plates 71, it is obvious that this apparatus is capable of heat and pressure sealing containers at the rate of hundreds of containers per minute since it can do so without interruption of the motion of the container filled with foodstuff or the like. Moreover the lid formed on the container is eminently suitable. Indeed, as shown in FIG. 7, this heat and pressure seal extends entirely around the flange portion 25 of the container 24 and has been applied with such pressure and heat that it would be impossible for the lid to inadvertently be stripped off the container, and thus, a very suitable package is formed.

I claim:

1. Apparatus for closing containers comprising:
   (a) a first endless chain of sealing dies,
   (b) a second endless chain of matching sealing dies adapted to hold said containers, said chains of matching sealing dies being movable in substantially the same plane of travel,
   (c) a closing station at which opposed matching dies from the respective chains travel together in substantially meshed relationship through a linear distance,
   (d) synchronized driving means for continuously moving said chains of matching sealing dies at the same rate of travel,
   (e) feeding means adjacent said closing station for continuously feeding to the closing station a strip of lidding material adapted to be heat sealed to said containers, and
   (f) heating means associated with at least one of said chains of sealing dies for maintaining the sealing dies at an elevated temperature sufficient to heat seal said lidding material to said containers.

2. Apparatus for closing containers comprising:
   (a) a first endless chain of sealing dies,
   (b) a second endless chain of matching sealing dies adapted to hold said containers, said chains of matching sealing dies being movable in substantially the same plane of travel,
   (c) a closing station at which opposed matching dies from the respective chains travel together in substantially meshed relationship through a linear distance,
   (d) synchronized driving means for continuously moving said chains of matching sealing dies at the same rate of travel,
   (e) pressuring means for urging said matching dies together at the closing station,
   (f) feeding means adjacent said closing station for continuously feeding to the closing station a strip of lidding material adapted to be heat sealed to said containers, and
   (g) heating means associated with at least one of said chains of sealing dies for maintaining the sealing dies at an elevated temperature sufficient to heat seal said lidding material to said containers.

3. Apparatus for closing containers comprising:
   (a) a first endless chain of sealing dies,
   (b) a second endless chain of sealing dies having respective die surfaces matching with the respective die surfaces of the dies of said first chain, said second endless chain of dies formed to hold said containers with a peripheral flange portion of said containers overlying its respective die surfaces,
   (c) a closing station at which opposed matching dies from the respective chains travel together in substantially meshed relationship through a linear distance,
   (d) synchronized driving means for continuously moving said chains of matching sealing dies in substantially the same plane and at the same rate of travel,
   (e) feeding means adjacent said closing station for continuously feeding to the closing station a strip of lidding material adapted to be heat sealed to said containers, and
   (f) heating means associated with at least one of said chains of sealing dies for maintaining the sealing dies at elevated temperature sufficient to heat seal said lidding material to said containers.

4. Apparatus according to claim 3 including a resilient gasket positioned on the die surface of the dies of said second chain to provide a resilient and thermal insulating element thereon.

5. Apparatus for closing containers comprising:
   (a) a first endless chain of sealing dies,
   (b) a second endless chain of sealing dies having respective die surfaces matching with the respective die surfaces of the dies of said first chain, said second endless chain of dies formed to hold said containers with a peripheral flange portion of said containers overlying its respective die surfaces, (c) a closing station at which opposed matching dies from the respective chains travel together in substantially meshed relationship through a linear distance,
(d) synchronized driving means for continuously moving said chains of matching sealing dies in substantially the same plane and at the same rate of travel,
(e) feeding means adjacent said closing station for continuously feeding to the closing station a strip of lidding material adapted to be heat sealed to said containers, and
(f) a heating device adjacent the die surfaces of the dies of said first chain positioned at a point remote from said closing station to heat the die surfaces to an elevated temperature.

6. Apparatus for closing containers comprising:
(a) a first endless chain of sealing dies,
(b) a second endless chain of matching sealing dies adapted to hold said containers, said chains of matching sealing dies being movable in substantially the same plane of travel,
(c) a closing station at which opposed matching dies from the respective chains travel together in substantially meshed relationship through a linear distance,
(d) synchronzied driving means for continuously moving said chains of matching sealing dies at the same rate of travel,
(e) feeding means for continuously feeding to the closing station a strip of lidding material adapted to be heat sealed to the containers comprising:
   (1) means for mounting a coil of lidding material adjacent said closing station, and
   (2) aligning means for directing a strip of lidding material from the coil to overlie peripheral flange portion of said containers, and
(f) heating means associated with at least one of said chains of sealing dies for maintaining the sealing dies at an elevated temperature sufficient to heat seal said lidding material to said containers.

7. Apparatus for closing containers comprising:
(a) a first endless chain of sealing dies,
(b) a second endless chain of matching sealing dies adapted to hold said containers, said chains of matching sealing dies being movable in substantially the same plane of travel,
(c) a closing station at which opposed matching dies from the respective chains travel together in substantially meshed relationship through a linear distance,
(d) synchronized driving means for continuously moving said chains of matching sealing dies at the same rate of travel,
(e) pressure rolls spaced from said closing station in pressure engagement with said first chain of dies as respective dies traverse said closing station to urge said respective dies toward opposed matching dies from said second chain,
(f) feeding means adjacent said closing station for continuously feeding to the closing station a strip of lidding material adapted to be heat sealed to said containers, and
(g) heating means associated with at least one of said chains of sealing dies for maintaining the sealing dies at an elevated temperature sufficient to heat seal said lidding material to said containers.

8. Apparatus for closing containers comprising:
(a) a first endless chain of sealing dies,
(b) a second endless chain of matching sealing dies adapted to hold said containers, said chains of matching sealing dies being movable in substantially the same plane of travel,
(c) a closing station at which opposed matching dies from the respective chains travel together in substantially meshed relationship through a linear distance,
(d) synchronized driving means for continuously moving said chains of matching sealing dies at the same rate of travel,
(e) feeding means adjacent said closing station for continuously feeding to the closing station a strip of lidding material adapted to be heat sealed to said containers,
(f) heating means associated with at least one of said chains of sealing dies for maintaining the sealing dies at an elevated temperature sufficient to heat seal said lidding material to said containers, and
(g) a cooling roll mounted adjacent to said closing station and adapted to ride against the lidding material, said cooling roll having a coolant circulated therethrough to immediately chill the heat sealed lidded container immediately after emerging from said closing station.

References Cited by the Examiner

UNITED STATES PATENTS

| | | | |
|---|---|---|---|
| 1,498,499 | 6/1924 | Wells | 83—321 |
| 1,512,202 | 10/1924 | Davis | 83—321 |
| 2,119,358 | 5/1938 | Scharf | 53—373 |
| 2,189,069 | 2/1940 | Jensen | 53—388 |
| 2,590,379 | 3/1952 | Cloud | 53—184 X |
| 2,613,489 | 10/1952 | Terry | 53—373 |
| 2,928,221 | 3/1960 | Smith | 53—182 |
| 3,000,157 | 9/1961 | Ollier et al. | 53—184 |
| 3,001,348 | 9/1961 | Rado | 53—182 |
| 3,018,594 | 1/1962 | Phillips et al. | 53—373 X |
| 3,112,590 | 12/1963 | O'Brien | 53—373 X |
| 3,129,545 | 4/1964 | Sloan et al. | 53—184 X |

TRAVIS S. McGEHEE, *Primary Examiner.*

ROBERT E. PULFREY, *Examiner.*